United States Patent
Austrheim et al.

(10) Patent No.: US 12,421,033 B2
(45) Date of Patent: Sep. 23, 2025

(54) CONTAINER HANDLING VEHICLE

(71) Applicant: Autostore Technology AS, Nedre Vats (NO)

(72) Inventors: Trond Austrheim, Etne (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 161 days.

(21) Appl. No.: 17/907,606

(22) PCT Filed: Mar. 18, 2021

(86) PCT No.: PCT/EP2021/056997
§ 371 (c)(1),
(2) Date: Sep. 28, 2022

(87) PCT Pub. No.: WO2021/197867
PCT Pub. Date: Oct. 7, 2021

(65) Prior Publication Data
US 2023/0145633 A1    May 11, 2023

(30) Foreign Application Priority Data
Mar. 30, 2020  (NO) .................................. 20200380

(51) Int. Cl.
*B65G 1/04*   (2006.01)
*B66C 19/00*  (2006.01)

(52) U.S. Cl.
CPC ............ *B65G 1/0464* (2013.01); *B66C 19/00* (2013.01)

(58) Field of Classification Search
CPC .............................. B65G 1/0464; B66C 19/00
See application file for complete search history.

(56) References Cited

U.S. PATENT DOCUMENTS 8,628,289 B1    1/2014  Benedict et al.
2020/0010307 A1*  1/2020  Gunji ..................... B66C 13/06

FOREIGN PATENT DOCUMENTS

CN    109843751 A    6/2019
CN    110461757 A    11/2019
(Continued)

OTHER PUBLICATIONS

International Search Report for corresponding International Application No. PCT/EP2021/056997, mailed Jun. 14, 2021 (4 pages).
(Continued)

*Primary Examiner* — Saul Rodriguez
*Assistant Examiner* — Willie W Berry, Jr.
(74) *Attorney, Agent, or Firm* — Baker Botts L.L.P.

(57) ABSTRACT

A container handling vehicle for lifting a storage container from an underlying framework structure includes a container lifting assembly for lifting the storage container and a vehicle body. The container lifting assembly includes a lifting frame for releasable connection to a storage container, a lifting shaft assembly, and a plurality of lifting bands. The lifting bands are connected to the lifting frame and the lifting shaft assembly such that the lifting frame may be raised or lowered by operating the lifting shaft assembly. The vehicle body includes a sidewall and a cantilevered section from which the lifting frame depends. The cantilevered section extends laterally from an upper end of the sidewall. The container lifting assembly features a lifting frame guide assembly comprising a first guide device and a cooperating second guide device. The first guide device is provided on the lifting frame. The second guide device is slidably connected to the sidewall via at least one vertically extending rail, such that the second guide device can move in a vertical direction relative to the sidewall. The first guide device and the second guide device are arranged to interact (Continued)

with each other when the lifting frame is adjacent the sidewall, such that horizontal movement of the lifting frame relative to the vehicle body is restricted.

13 Claims, 11 Drawing Sheets

(56) References Cited

FOREIGN PATENT DOCUMENTS

| | | |
|---|---|---|
| EP | 2 468 677 A1 | 6/2012 |
| JP | 2009057185 A | 3/2009 |
| NO | 317366 B1 | 10/2004 |
| WO | 2014/075937 A1 | 5/2014 |
| WO | 2014/090684 A1 | 6/2014 |
| WO | 2015/193278 A1 | 12/2015 |
| WO | 2018/146304 A1 | 8/2018 |
| WO | 2019/101366 A1 | 5/2019 |
| WO | 2019/101725 A1 | 5/2019 |
| WO | 2019081092 A1 | 5/2019 |

OTHER PUBLICATIONS

Written Opinion for corresponding International Application No. PCT/EP2021/056997, mailed Jun. 14, 2021 (9 pages).

Norwegian Search Report in counterpart Application No. 20200380 issued Oct. 26, 2020 (2 pages).

Susumu Miyake, Notice of Reasons for Rejection in Japanese Patent Application No. 2022-559382, pub. by Japan Patent Office, Tokyo, Japan, mailed Mar. 13, 2025, 5 pages (inclusive of translation).

Anonymous, Written Opinion of the First Office Action in Chinese patent application 2021800375119, pub. by SIPO, Beijing, China, Jan. 22, 2025, 5 pages.

W. Lijiao, National Intellectual Property Administration (SIPO) Search Report, pub. by SIPO, Beijing, China, Jan. 22, 2025, in Chinese (3 pages) with English translation (2 pages).

Oatkaew, Srikdanin, Office Action for Thailand Patent Application No. TH2201006344, dated Jun. 6, 2025, 7 pages, pub. by Thailand Patent Office, Mueang Nonthaburi District Thailand. (Includes Translation).

Notification of the Second Office Action in Chinese patent application 2021800375119, Jul. 29, 2025, 8 pages (including translation), Beijing, China.

* cited by examiner

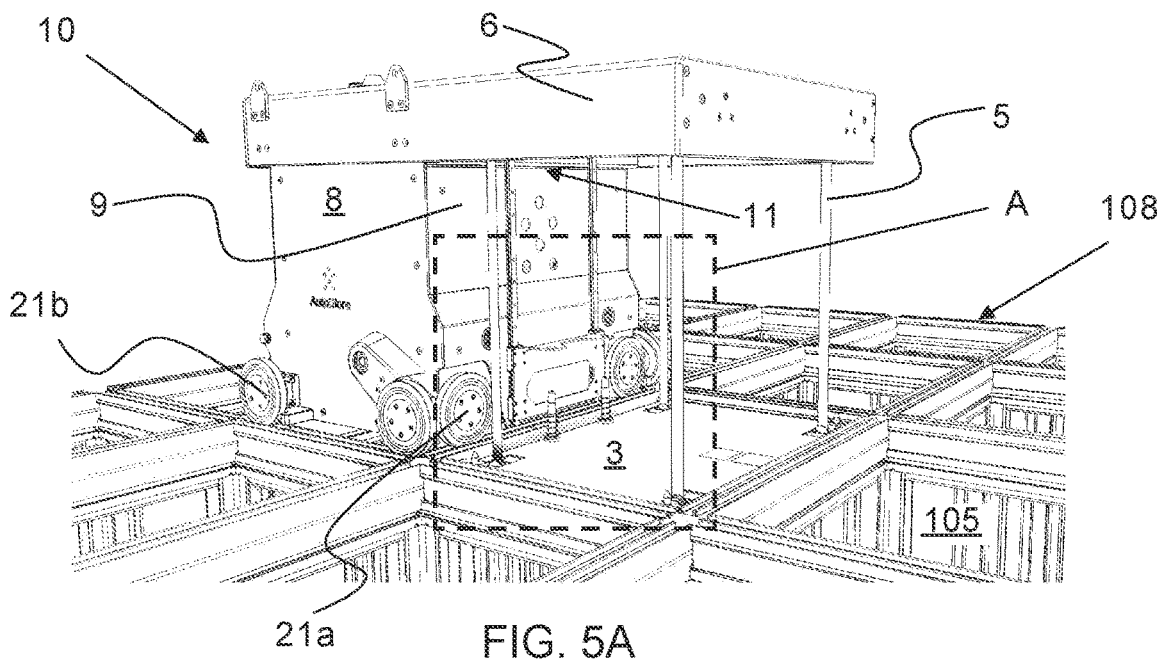
FIG. 5A
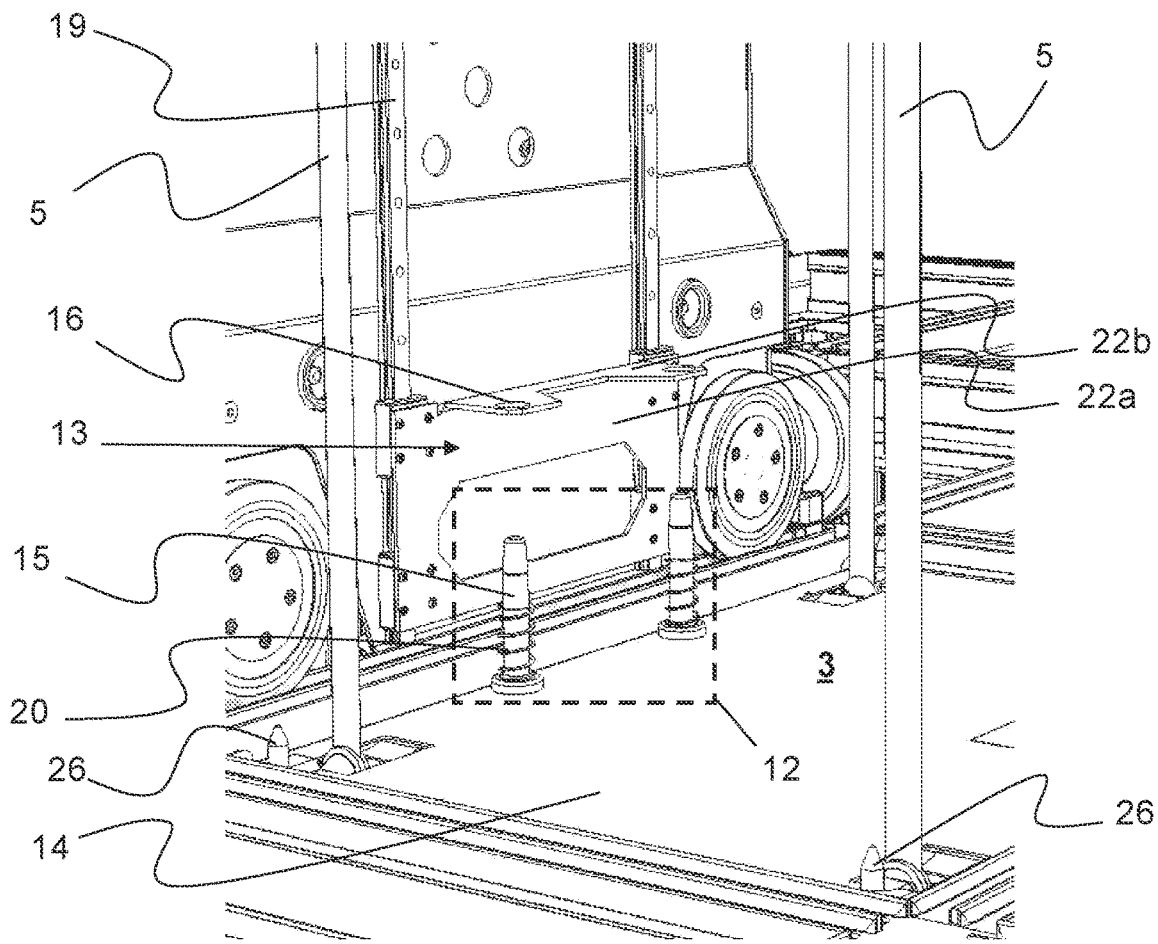
FIG. 5B (Detail A)

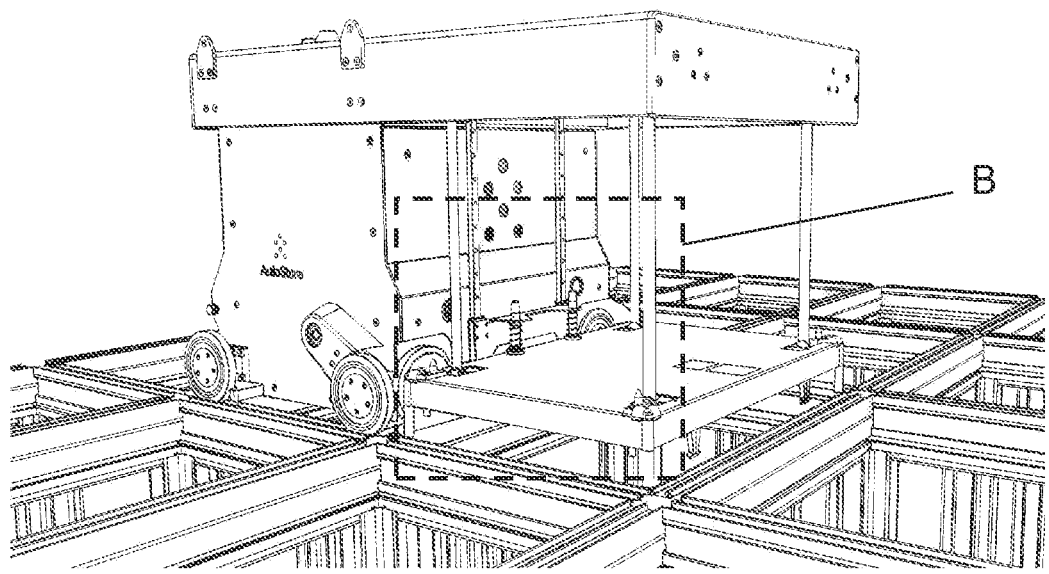
FIG. 6A
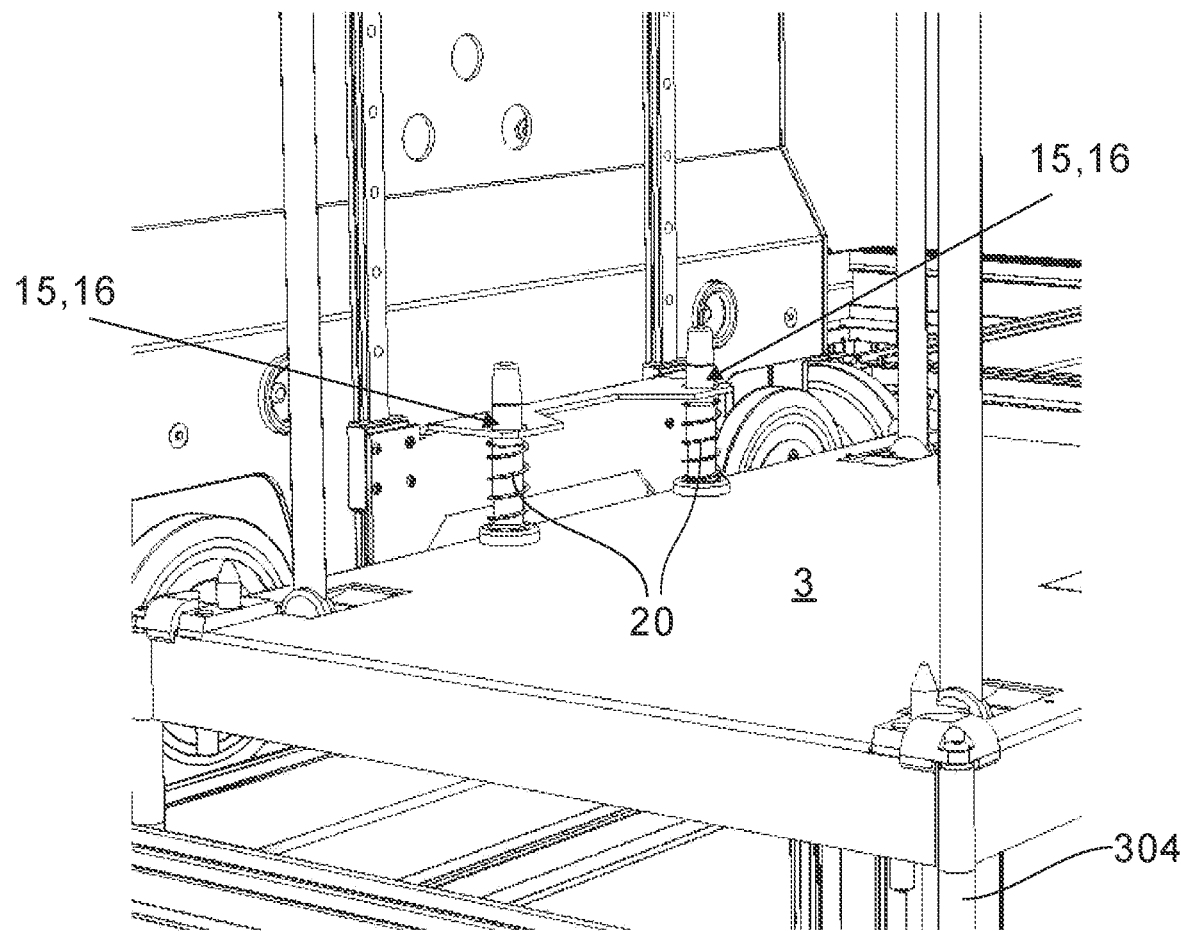
FIG. 6B (Detail B)

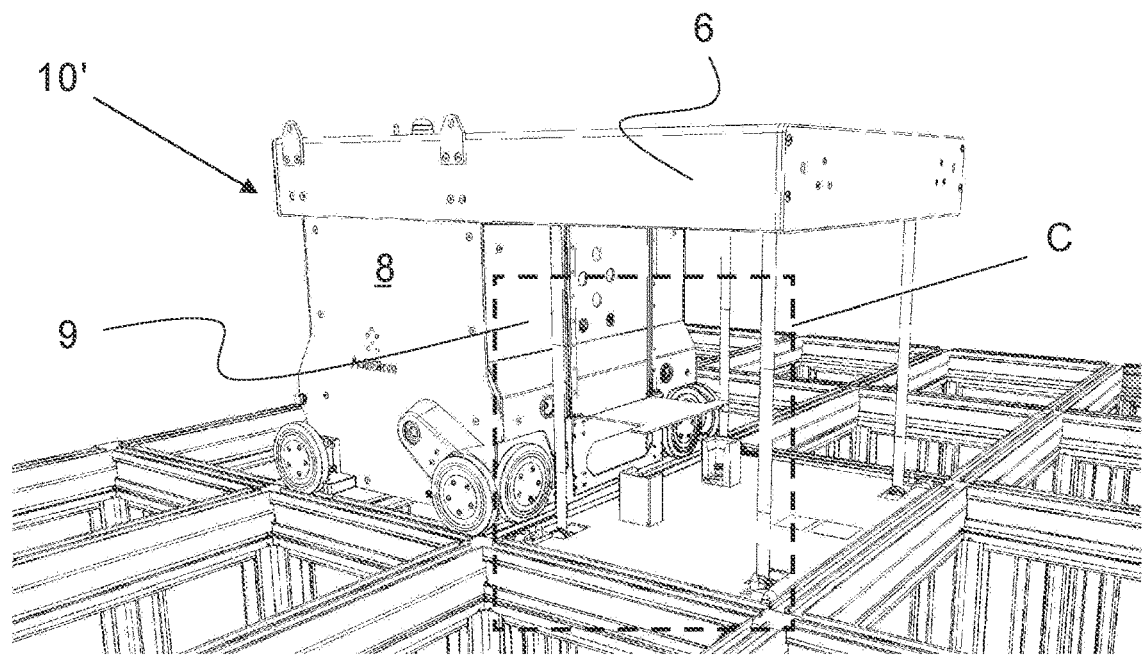
FIG. 9A
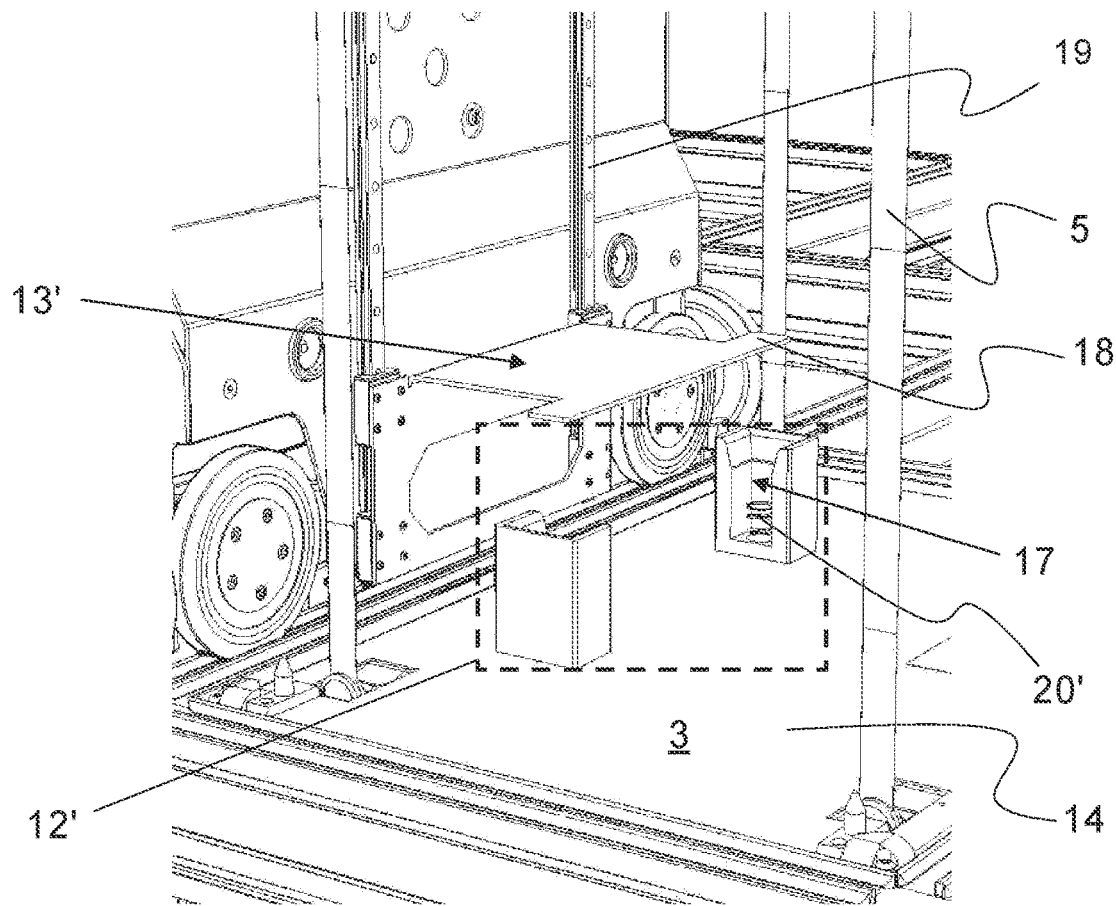
FIG. 9B (Detail C)

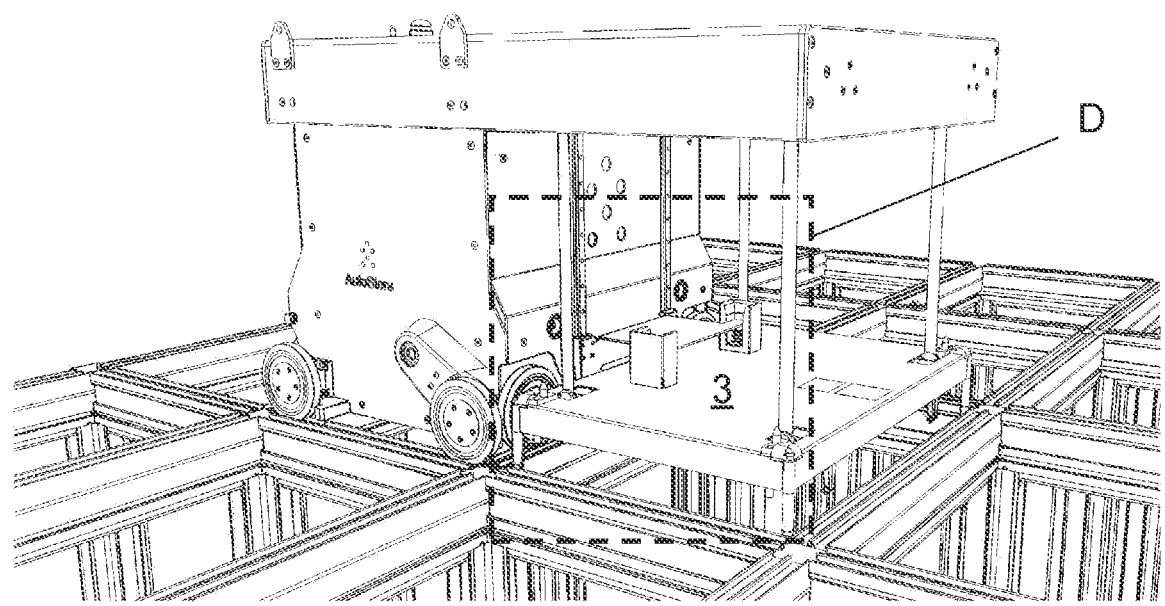
FIG. 10A
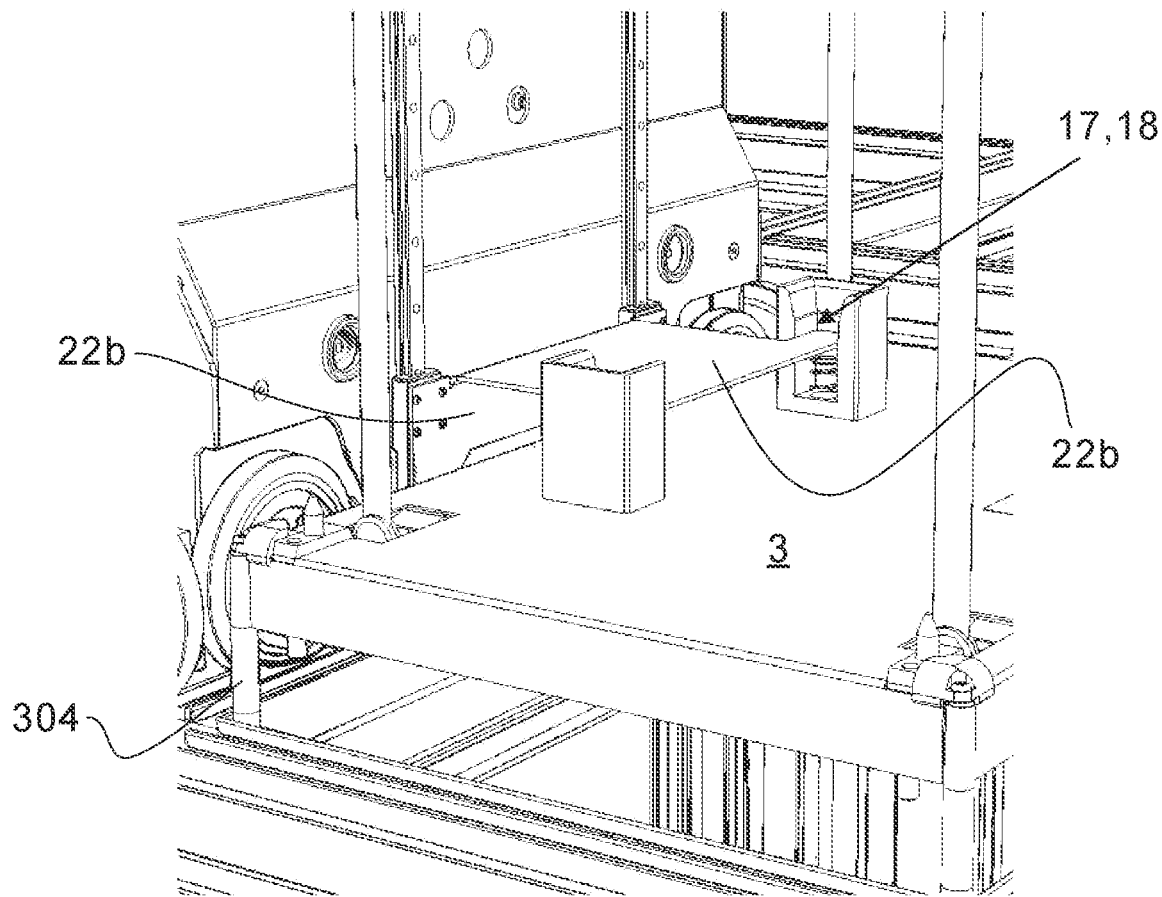
FIG. 10B (Detail D)

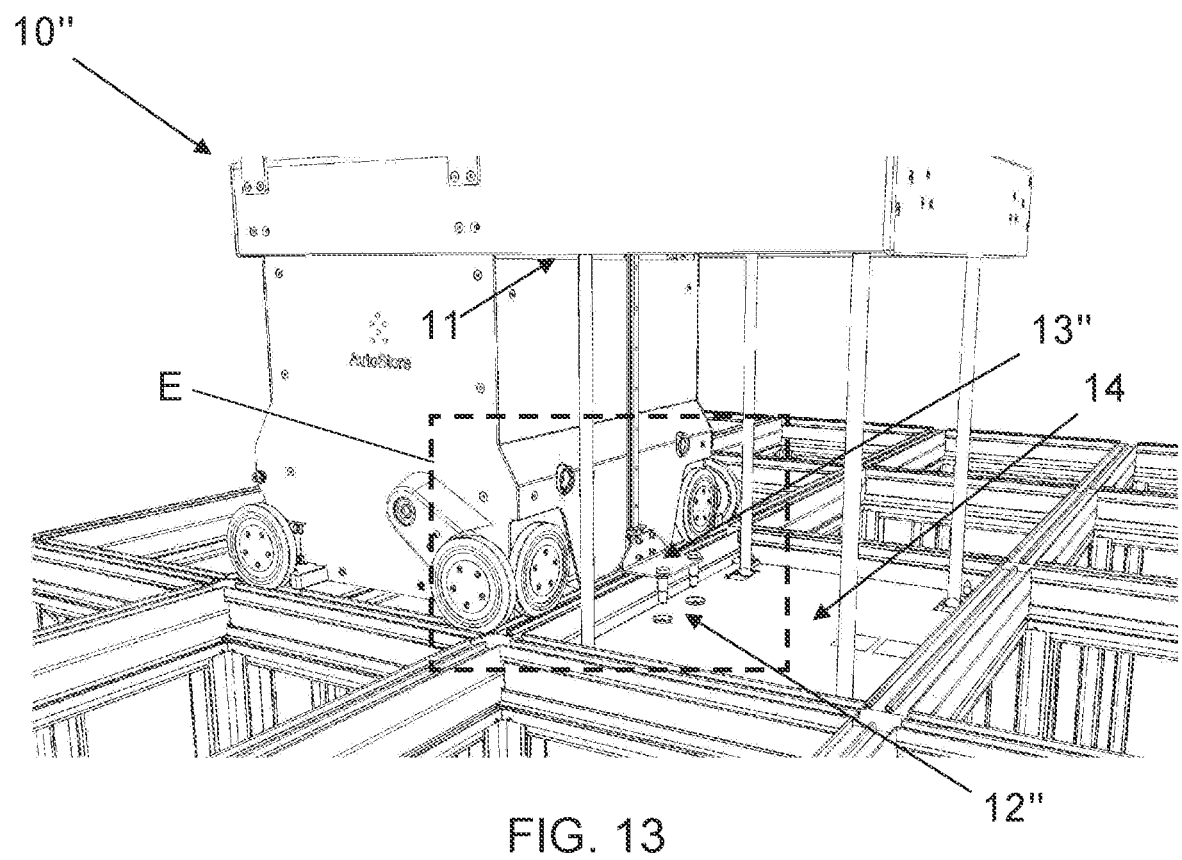
FIG. 13
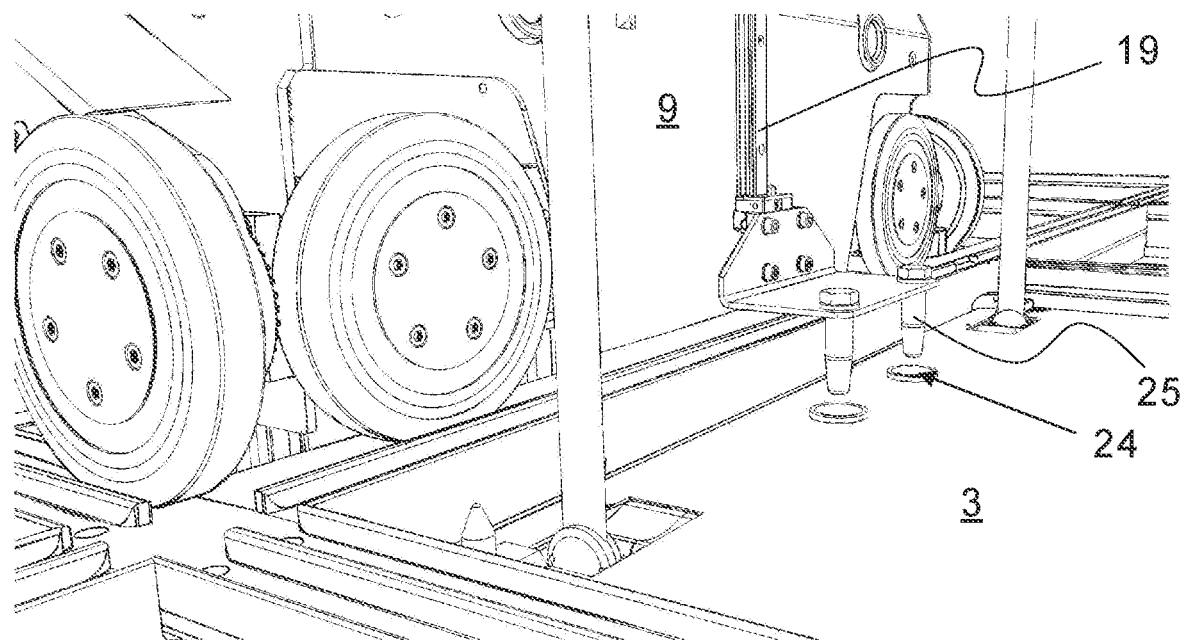
FIG. 14 (Detail E)

CONTAINER HANDLING VEHICLE

FIELD OF THE INVENTION

The present invention relates to a container handling vehicle, or robot, for picking up storage containers from a storage system, and a storage system comprising such a vehicle.

BACKGROUND AND PRIOR ART

FIG. 1 discloses a typical prior art automated storage and retrieval system 1 with a framework structure 100 and FIGS. 2 to 4 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device 2 (shown in FIG. 4) for vertical transportation of storage containers 106, e.g. raising a storage container 106 from, and lowering a storage container 106 into, a storage column 105. The lifting device 2 comprises a lifting frame 3 having one or more gripping/engaging devices 4 adapted to engage a storage container 106 and guide pins 304 for correct positioning of the lifting frame 3 relative to the storage container 106. The lifting frame 3 can be lowered from the vehicle 201,301 by lifting bands 5 so that the position of the lifting frame with respect to the vehicle 201,301 can be adjusted in a third direction Z which is orthogonal the first direction X and the second direction Y.

The lifting frame 3 (not shown) of the container handling vehicle 201 in FIG. 2 is located within the vehicle body 201a. An advantage of this arrangement is that horizontal movement of the lifting frame 3, due to movement and acceleration of the vehicle, is prevented by interaction with inner surfaces of the vehicle body when the lifting frame enters the vehicle body.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 ... n and Y=1 ... n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

A disadvantage of the prior art container handling vehicle 301 shown in FIGS. 3 and 4 is that horizontal movement of the lifting frame 3 is not prevented until the lifting frame 3 is fully raised and in contact with an underside of the cantilevered section 6 from which the lifting frame 3 depends. When fully raised, combined guiding pins/contact sensors 26 provided on the top side of the lifting frame 3 interact with the cantilever section 6 and restrain horizontal movement between the lifting frame 3 and the cantilever section 6. To avoid potential errors caused by a horizontally moving lifting frame 3, the container handling vehicle 301 in FIGS. 3 and 4 should not move upon the rail system 108 until the lifting frame is fully raised. The time delay of having the container handling vehicle 301 standing still until the lifting frame is fully raised is minor. However, a storage system will commonly have a plurality of container handling vehicles, wherein each vehicle performs many lifting operations. Consequently, a slight time delay for each operation will add up and contribute to a less than optimal efficiency of the storage system.

The object of the present invention is to provide an improved container handling vehicle, wherein some of the disadvantages of the prior art vehicles featuring a cantilevered section are avoided or alleviated.

SUMMARY OF THE INVENTION

The present invention is defined by the attached claims and in the following:

In a first aspect, the present invention provides a container handling vehicle for lifting a storage container from an underlying framework structure,
the vehicle comprises a container lifting assembly for lifting the storage container and a vehicle body;
the container lifting assembly comprises a lifting frame for releasable connection to a storage container, a lifting shaft assembly and a plurality of lifting bands, the lifting bands are connected to the lifting frame and the lifting shaft assembly such that the lifting frame may be raised or lowered by operating the lifting shaft assembly; and
the vehicle body comprises a sidewall and a cantilevered section from which the lifting frame depends, the cantilevered section extends laterally from an upper end of the sidewall; wherein
the container lifting assembly features a lifting frame guide assembly comprising a first guide device and a cooperating second guide device;
the first guide device is provided on the lifting frame; and
the second guide device is slidably connected to the sidewall via at least one vertically extending rail, such that the second guide device can move in a vertical direction relative to the sidewall;
the first guide device and the second guide device are arranged to interact with each other when the lifting frame is adjacent the sidewall, such that horizontal movement of the lifting frame relative to the vehicle body is restricted.

In an embodiment of the container handling vehicle, the first guide device and the second guide device may be arranged to interact with each other when the lifting frame is adjacent the sidewall, such that horizontal movement of the lifting frame relative to the vehicle body is restricted or prevented.

The lifting bands may provide a lifting band end connected at one of four corner sections of the lifting frame. In an embodiment, the container handling vehicle may comprise four lifting bands.

In other words, the lifting bands may be connected to the lifting frame and the lifting shaft assembly such that the lifting frame may be raised or lowered relative to the cantilevered section by operating the lifting shaft assembly.

In other words, the lifting frame is suspended, or depends, from an underside of the cantilevered section.

In an embodiment of the container handling vehicle, the first guide device may extend upwards from the lifting frame, e.g. as a pin, or into a topside of the lifting frame, e.g. a hole.

In an embodiment of the container handling vehicle, the first guide device may be provided on a top side of the lifting frame. The first guide device may extend upwards from the top side of the lifting frame, e.g. as a pin, or into the topside of the lifting frame, e.g. a hole.

In an embodiment of the container handling vehicle, the first guide device may be connected to the lifting frame such that horizontal movement of the first guide device relative to the lifting frame is prevented. In other words, the first guide device may be fixed or rigidly connected to the lifting frame.

In other words, the first guide device and the second guide device may be arranged to interact and restrict or prevent horizontal movement between them when the lifting frame is adjacent the sidewall such that horizontal movement of the lifting frame relative to the vehicle body is restricted or prevented.

In other words, the first guide device and the second guide device may be arranged to interact with each other when the lifting frame is moving in a vertical direction adjacent the sidewall, such that horizontal movement of the lifting frame relative to the vehicle body is restricted or prevented.

In an embodiment of the container handling vehicle, the first guide device and the second guide device may be arranged to interact such that horizontal movement between them is restricted or prevented.

In an embodiment of the container handling vehicle, the second guide device may be slidably connected to the sidewall, such that horizontal movement of the second guide element relative to the sidewall is restricted or prevented.

In an embodiment of the container handling vehicle, the vertically extending rail may extend from a lower position on the sidewall towards the cantilevered section, such that the second guide device may move in a vertical direction between a lower position adjacent to the sidewall and an upper position adjacent to the sidewall in which upper position the lifting frame is in contact with the cantilevered section.

In an embodiment of the container handling vehicle, the at least one vertically extending rail may be at least one vertical rail.

In an embodiment of the container handling vehicle, the first guide device may comprise at least one first guide element and the second guide device may comprise at least one second guide element, wherein the first guide element and the second guide element have complementary shapes such that horizontal movement between the first guide element and the second guide element is restricted when the first guide element interact with the second guide element. The complementary shapes of a first guide element and a second guide element may have respective opposite facing surfaces which restrict or prevent horizontal movement of the complementary shapes relative to each other when the complementary shapes interact.

In an embodiment of the container handling vehicle, a part of the second guide device may be arranged at a position between the cantilevered section and the lifting frame. The part may comprise at least one second guide element.

In an embodiment of the container handling vehicle, the second guide device may be a carriage. The carriage may comprise a first part slidably connected to the sidewall by the at least one rail and a second part arranged at a position between the cantilevered section and the lifting frame. The second part may comprise at least one second guide element.

In an embodiment of the container handling vehicle, one of the first guide device and the second guide device may comprise at least one guide element being a pin, protrusion, recess or hole and the other one of the first guide device and the second guide device may comprise a complementary guide element for interacting with the at least one pin, protrusion, recess or hole, such that horizontal movement of the first guide device relative to the second guide device is restricted or prevented.

In an embodiment of the container handling vehicle, the first guide device may comprise two first guide elements being horizontally spaced, and the second guide device may comprise two second guide elements, each of the first guide elements arranged to interact with a corresponding second guide element. The spacing of the guide devices can help to react torque on the lifting frame during vehicle movements, such as during acceleration or deceleration. In another embodiment, the numbers of first and second guide elements could be different. For example, there could be two first guide elements in the form of guide pins and a second guide element in the form of a slot.

In an embodiment of the container handling vehicle, the first guide element may be a pin, vertical recess or hole, and the second guide element may be a hole, horizontal protrusion or pin, respectively.

In an embodiment of the container handling vehicle, at least one of the first guide element and the second guide element may comprise inclined surfaces for guiding the first and second guide device into interaction.

In an embodiment of the container handling vehicle, one of the first guide device and the second guide device may comprise at least one pin or vertical recess, and one of the first guide device and the second guide device comprises a cooperating hole or protrusion, respectively, such that horizontal movement of the first guide device relative to the second guide device is restricted or prevented.

In an embodiment of the container handling vehicle, one of the first guide device and the second guide device may comprise a spring or other compliant device arranged to dampen the interaction between the first guide device and the second guide device in a vertical direction.

In an embodiment, the container handling vehicle may comprise
- a first set of wheels arranged on opposite sides of the vehicle body, for moving the vehicle along a first direction on a rail system of the underlying framework structure;
- a second set of wheels arranged on other opposite sides of the vehicle body, for moving the vehicle along a second direction on the rail system, the second direction being perpendicular to the first direction; and
- the first set of wheels being displaceable in a vertical direction between a first position, wherein the first set of wheels allows movement of the vehicle along the first direction, and a second position, wherein the second set of wheels allows movement of the vehicle along the second direction.

In a second aspect, the present invention provides a storage system comprising a framework structure and at least one container handling vehicle according to the first aspect of the invention, wherein the framework structure comprises multiple storage columns, in which storage containers may be stored on top of one another in vertical stacks, and the container handling vehicle is operated on a rail system at a top level of the framework structure for retrieving storage containers from, and storing storage containers in, the storage columns, and for transporting the storage containers horizontally across the rail system. The rail system may be a rail grid system allowing movement of the container handling vehicle in two perpendicular directions.

In a third aspect, the present invention provides a method of operating a container handling vehicle in a storage system,
the storage system comprising a framework structure and at least one container-handling vehicle, wherein the framework structure comprises multiple storage columns, in which storage containers may be stored on top of one another in vertical stacks, and the container handling vehicle is operated on a rail system at a top level of the framework structure for retrieving storage containers from, and storing storage containers in, the storage columns, and for transporting the storage containers horizontally across the rail system,
the container handling vehicle comprises a container lifting assembly, for lifting the storage container, and a vehicle body;
the container lifting assembly comprises a lifting frame for releasable connection to a storage container, a lifting shaft assembly and a plurality of lifting bands, the lifting bands are connected to the lifting frame and the lifting shaft assembly such that the lifting frame may be raised or lowered by operating the lifting shaft assembly; and
the vehicle body comprises a sidewall and a cantilevered section from which the lifting frame is suspended, the cantilevered section extends laterally from an upper end of the sidewall; wherein
the container lifting assembly features a lifting frame guide assembly comprising a first guide device and a cooperating second guide device;
the first guide device is provided on the lifting frame; and
the second guide device is slidably connected to the sidewall via at least one vertically extending rail, such that the second guide device can move in a vertical direction relative to the sidewall;
the first guide device and the second guide device are arranged to interact with each other when the lifting frame is adjacent the sidewall such that horizontal movement of the lifting frame relative to the vehicle body is restricted or prevented; wherein
the method comprises the steps of:
lowering a storage container into a storage column by use of the container lifting assembly;
releasing the storage container from the lifting frame;
raising the lifting frame until the first guide device interacts with the second guide device; and
moving the container handling vehicle horizontally across the rail system when a lowermost level of the lifting frame is above an uppermost level of the rail system and before the lifting frame has reached an upper position.

In a fourth aspect, the present invention provides a method of preventing horizontal movement of a lifting frame of a container handling vehicle, the container handling vehicle comprises a container lifting assembly, for lifting a storage container, and a vehicle body;
the container lifting assembly comprises a lifting frame for releasable connection to a storage container, a lifting shaft assembly and a plurality of lifting bands, the lifting bands are connected to the lifting frame and the lifting shaft assembly such that the lifting frame may be raised or lowered by operating the lifting shaft assembly; and
the vehicle body comprises a sidewall and a cantilevered section from which the lifting frame is suspended, the cantilevered section extends laterally from an upper end of the sidewall;
the container lifting assembly features a lifting frame guide assembly comprising a first guide device and a cooperating second guide device;
the first guide device is provided on the lifting frame; and
the second guide device is slidably connected to the sidewall via at least one vertically extending rail, such that the second guide device can move in a vertical direction relative to the sidewall;
wherein the method comprises the steps of:

raising the lifting frame from a level below the container handling vehicle to a first position in which interaction between the first guide device and the second guide device is initiated; and raising the lifting frame from the first position to a second position in which the first guide device and the second guide device interact with each other and horizontal movement of the lifting frame relative to the vehicle body is restricted or prevented.

In an embodiment, the method according to the fourth aspect comprises a step of:

raising the lifting frame from the second position to a third position, while the second guide device is simultaneously moved up the vertically extending rail by the lifting frame, the first guide device simultaneously interacting with the second guide device to restrict horizontal movement of the lifting frame relative to the vehicle body.

In the second and third positions, and in positions between the second and third positions, the lifting frame may be at a level allowing horizontal movement of the container handling vehicle. In the third position, the lifting frame may be in contact, or docking, with the cantilevered section.

In the third and fourth aspect of the invention, the container handling vehicle may be according to any of the embodiments of the first aspect.

The term "sidewall" is intended to mean a side section of the vehicle body. The side section may comprise a cover plate but may also be a framework structure. The side section may be substantially vertical.

The term "horizontal movement" is intended to comprise bot lateral and rotational horizontal movement.

BRIEF DESCRIPTION OF THE DRAWINGS

Embodiments of the invention is described in detail by reference to the following drawings:

FIGS. 5-8 are perspective side views of a first exemplary container handling vehicle according to the invention.

FIGS. 9-11 are perspective side views of a second exemplary container handling vehicle according to the invention.

FIGS. 13-16 are perspective side views of a third exemplary container handling vehicle according to the invention.

DETAILED DESCRIPTION OF THE INVENTION

Figure 1:
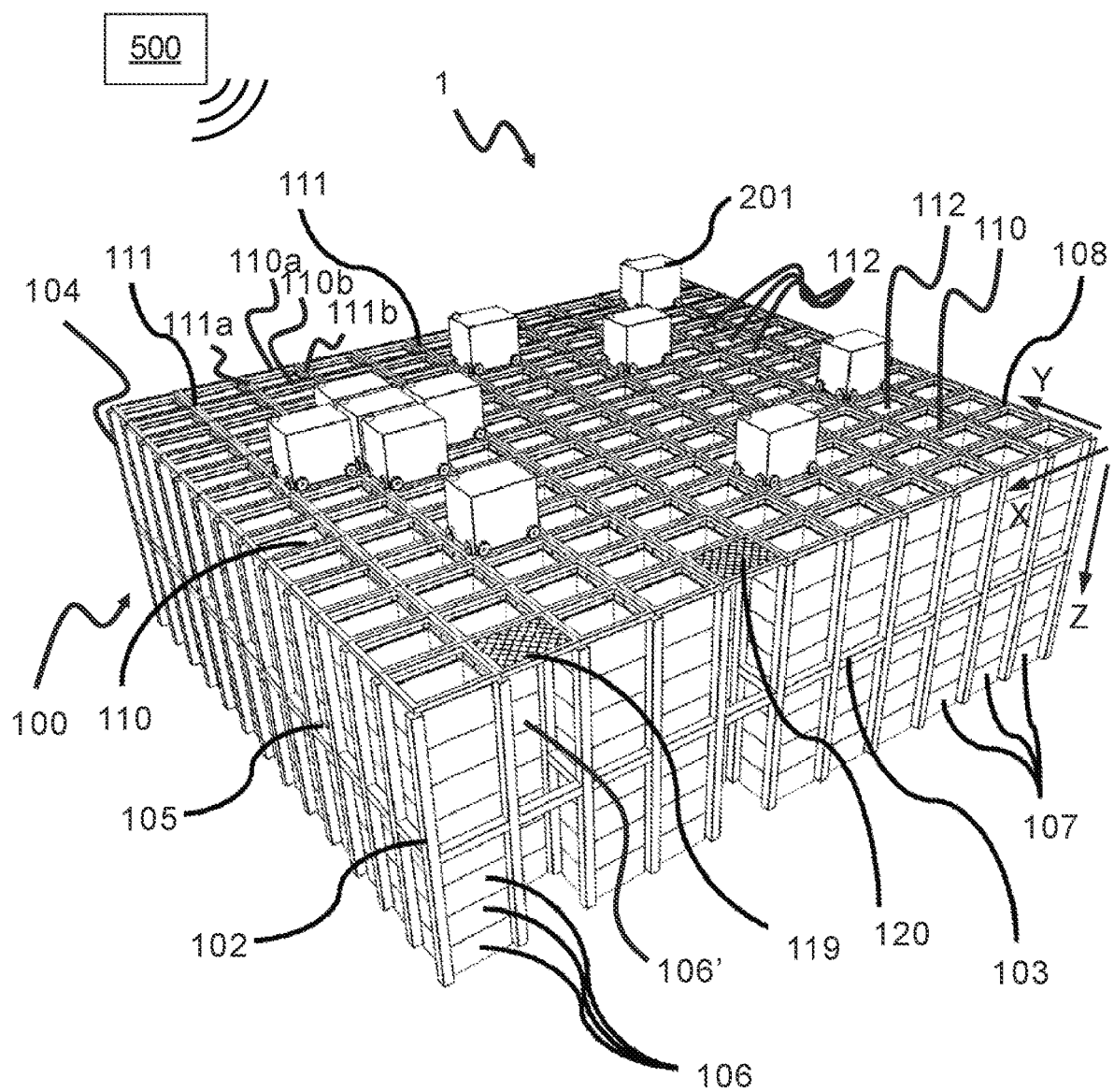
FIG. 1 is a perspective view of a framework structure of a prior art automated storage and retrieval system.
Figure 2:
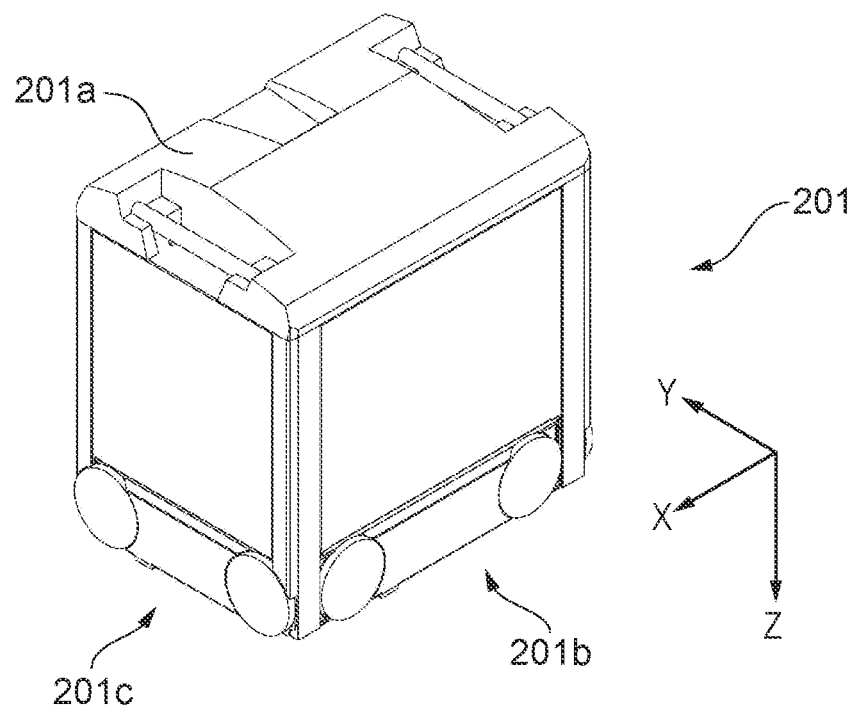
FIG. 2 is a perspective view of a prior art container handling vehicle having a centrally arranged cavity for carrying storage containers therein.

In the following, embodiments of the invention will be discussed in more detail with reference to the appended drawings. However, the drawings are not intended to limit the invention to the subject-matter depicted in the drawings.

The present invention is a remotely operated container handling vehicle for use in an automated storage system featuring at least one rail system, e.g. a rail system 108 as discussed for the prior art storage system disclosed in FIG. 1.

Different exemplary embodiments of a container handling vehicle 10-10" according to the invention are shown in FIGS. 5-16. The vehicles 10-10" are for picking up storage containers 106 in an automated storage system 1, e.g. as shown in FIG. 1, by use of a container lifting assembly 3,5,7a,7b. The container lifting assembly features a lifting frame 3 for releasable connection to a storage container 106, a lifting shaft assembly 7a,7b (see FIG. 12) and four lifting bands 5. The lifting bands 5 are connected to the lifting frame 3 and the lifting shaft assembly 7a,7b such that the lifting frame 3 may be raised or lowered by operating the lifting shaft assembly.

The container handling vehicles 10-10" have a vehicle body 8 comprising a sidewall 9 and a cantilevered section 6. The lifting frame 3 is suspended from the cantilevered section 6 which extends laterally from an upper end 11 of the sidewall 9. As in the prior art vehicles, the lifting frame features combined guiding pins/contact sensors 26 arranged on the top side of the lifting frame 3 (see FIG. 5b). The guiding pins/contact sensors 26 interact with the cantilever section 6 when the lifting frame is fully raised and restrain horizontal movement between the lifting frame 3 and the cantilever section 6.

To restrict horizontal movement of the lifting frame 3 during movement of the container handling vehicles 10-10", each of the container handling vehicle 10-10" features a lifting frame guide assembly having a first guide device 12-12" and a cooperating second guide device 13-13". The first guide device 12-12" features at least one first guide element 15,17,24, and the second guide device 13-13" features at least one second guide element 16,18,25, wherein the first and second guide elements have complementary shapes. The complimentary shapes are designed to restrict horizontal movement, i.e. both lateral and rotational horizontal movement, between the first and the second guide element when the guide elements interact with each other.

The second guide device 13-13" of the lifting frame guide assembly may be described as a carriage (e.g. made up of plate sections 22a,22b, see below) slidably connected to the sidewall 9, e.g. via at least one rail 19,19'. The carriage couples with the lifting frame 3 via the first guide device 12-12" and moves with the lifting frame 3 as the lifting frame 3 moves from a position below the halfway point up to where the lifting frame docks with the cantilever section.

The complimentary shapes of the first guide element 15,17,24 and the second guide element 16,18,25 serve to locate the first guide device 12-12" and the second guide device 13-13" together as the lifting frame 3 is raised and emerges from the storage grid, e.g. from a storage column 105 as shown in FIG. 1. The complimentary shapes may be of any shape or form provided the first and second guide device are restrained from horizontal movement relative to each other when located together. When positioned within the storage column 105, horizontal movement of the lifting frame 3 is restricted by the inner periphery of the storage column 105. When the lifting frame 3 emerges from the storage column 105, horizontal restraint of the lifting frame 3 is provided by the second guide device 13-13" locking down the horizontal movement through connection with the first guide device 12-12".

A first exemplary embodiment of a container handling vehicle 10 according to the invention is shown in FIGS. 5-8.

The first guide device 12 of the first exemplary embodiment comprise two vertical pins 15 (i.e. first guide elements)

arranged on a top side 14 of the lifting frame 3. The two pins 15 are connected to the lifting frame 3 such that horizontal movement of the pins relative to the lifting frame 3 is prevented.

The second guide device 13 comprises two holes 16 (i.e. second guide elements), each hole being sized to accommodate one of the vertical pins 15 of the first guide device 12. The second guide device 13 is slidably connected to the sidewall 9 via two rails 19 and can move in a vertical direction relative to the sidewall 9. A part of the second guide device 13 featuring the two holes 16 extends laterally from the sidewall 9 and at a position between the cantilevered section 6 and the lifting frame 3. In this embodiment, the second guide device is made up of a first plate section 22a and a second plate section 22b. The first plate section 22a is connected to the rails 19, and the second plate section 22b features the two holes 16 and extends from an upper end of the first plate section 22a and between the cantilevered section 6 and the lifting frame 3.

The pins 15 and holes 16 are arranged to interact with each other, i.e. each of the pins 15 is accommodated in a corresponding hole 16, when the lifting frame 3 is adjacent the sidewall 9 such that horizontal movement of the lifting frame 3 relative to the vehicle body 8 is restricted. By having two pins 15 and complimentary holes 16 rotational horizontal movement, i.e. twisting, of the lifting frame relative to the vehicle body 8 is restricted.

It is noted that the circular peripheries (i.e. the complimentary shapes) of the pins 15 and the holes 16 necessitate the solution of having two of each to restrict rotational movement of the lifting frame relative to the vehicle body 8. However, in other embodiments of the invention, having at least two first guide elements and at least two complimentary second guide elements are not essential for restricting the rotational movement. In other embodiments, rotational movement may for instance be restricted by designing the first guide element as a pin/protrusion having a square or rectangular peripheral shape, and the second guide element as a cooperating hole having a complimentary square or rectangular peripheral shape. In general, to restrict rotational horizontal movement between the lifting frame and the vehicle body while having a single first guide element and a single second guide element it may be sufficient to provide the first and second guide elements with complimentary non-circular peripheral shapes.

To avoid excessive noise and wear, and potentially reduce any risk of the first and second guide device being jammed, a spring 20 or other compliant device is arranged around each of the pins 15 to dampen the interaction between the first and the second guide device 12,13 and the lifting frame 3.

By having the second guide device 13 slidably connected to the sidewall 9 of the vehicle body 8, the lifting frame 3 can be raised from a lower position close to the rail system 108 where it emerges from the lateral constraints of the grid, to a higher position adjacent the sidewall 9 while horizontal movement of the lifting frame 3 is restricted or prevented. The lowermost level of the lifting frame 3 when in the lower position is above an uppermost level of a rail system 108 upon which the container handling vehicle is arranged, see FIG. 7. In the upper position, the lifting frame is fully raised towards the cantilevered section 6.

Thus, due to the lifting frame guide assembly 12,13, the container handling vehicle according to the invention may start to move upon the rail system 108 as soon as the lifting frame is in the lower position, e.g. after storing a storage container 106 in a storage column 105. In most instances when the lifting frame is not connected to a storage container 106, the lifting frame is kept in the lower position while the container handling vehicle moves upon the rail system 108. In this manner time and energy is also saved by not requiring the lifting frame to be lifted between the cantilever section and the lower position when a storage container is to be retrieved. The lifting frame guide assembly 12,13 will also ensure that the container handling vehicle 10 can move upon the rail system 108 as soon as a storage container connected to the lifting frame 3 is lifted above the rail system 108, see FIG. 8. The latter feature is advantageous when the container handling vehicle is used in a storage system comprising storage containers of different heights, since a storage container being lower than the maximum storage container height may be lifted clear of the rail system before the lifting frame is at its upper position in contact with the cantilever section.

Figure 3:
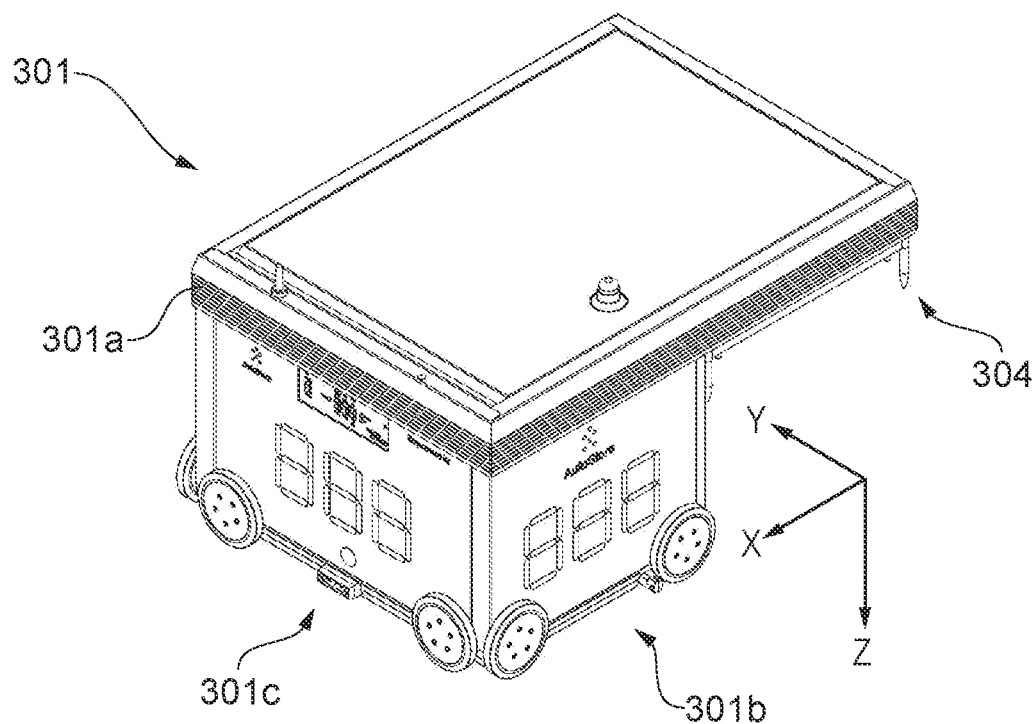
FIG. 3 is a perspective view of a prior art container handling vehicle having a cantilevered section for carrying storage containers underneath.
Figure 4:
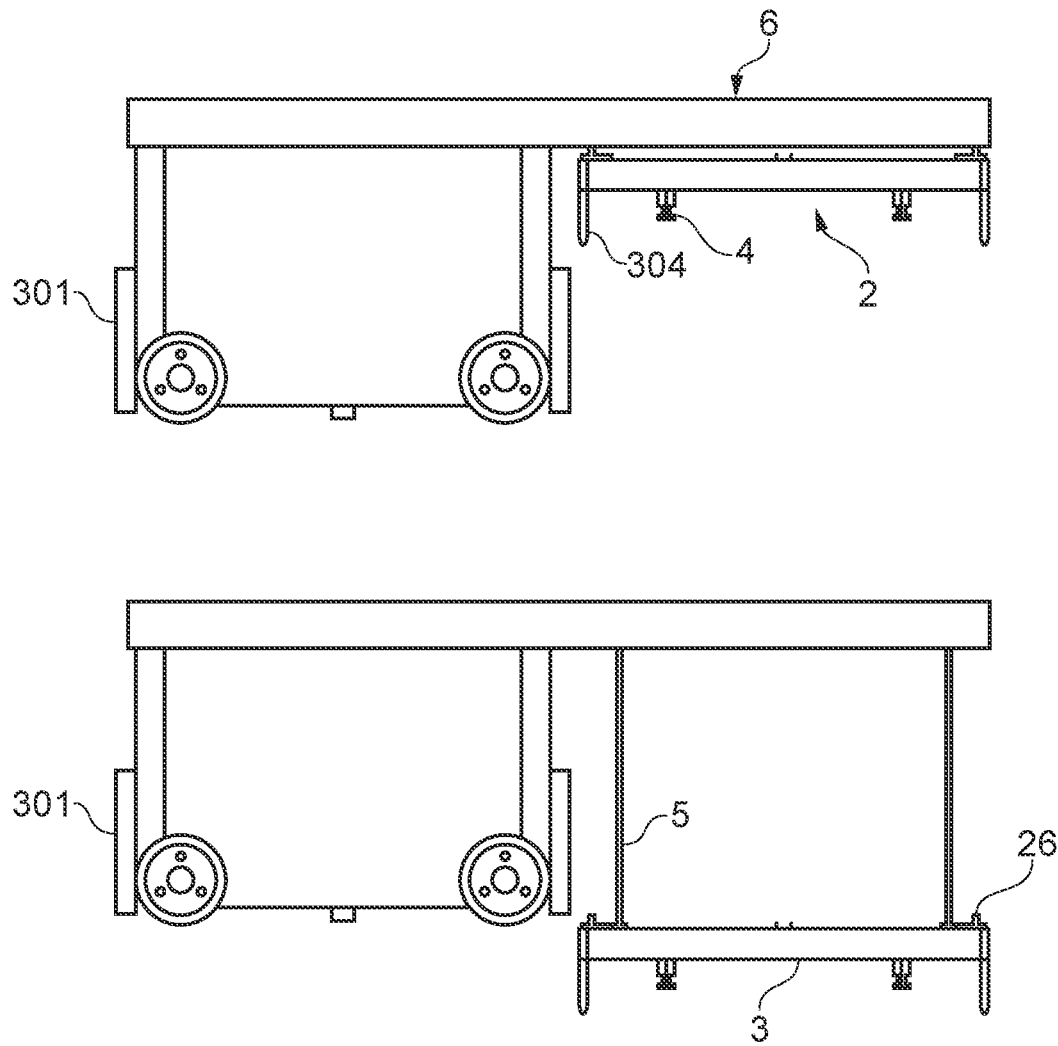
FIG. 4 are side views of the container handling vehicle in FIG. 3, wherein a lifting device is shown.
Figure 7:
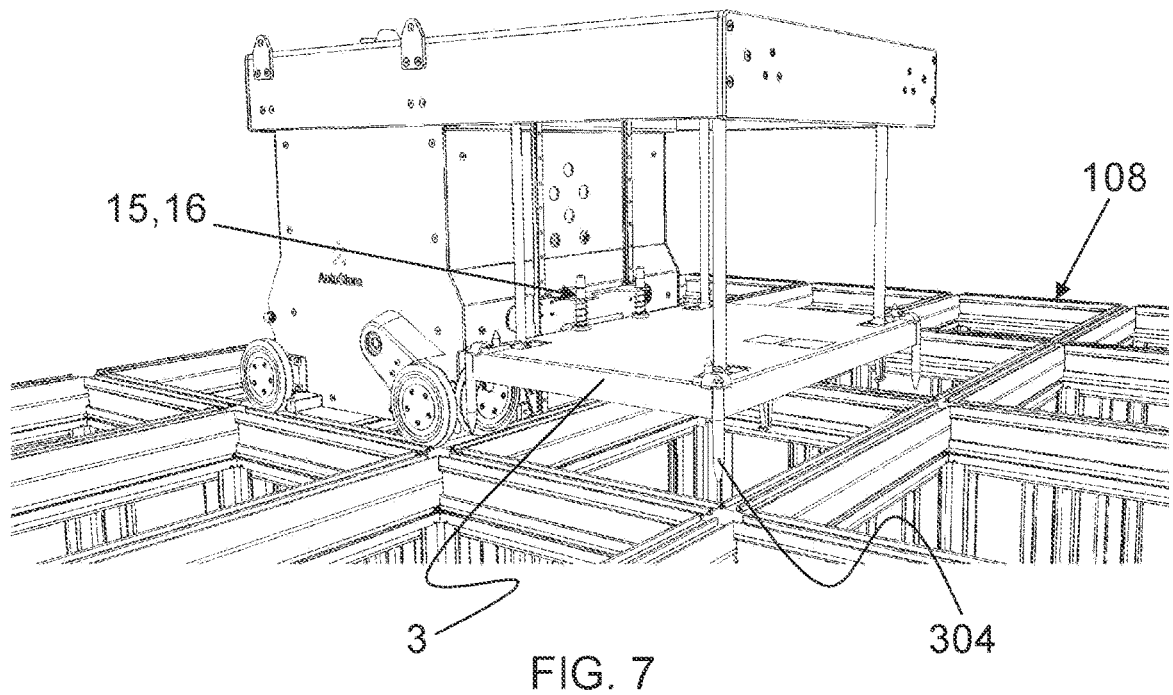
Figure 8:
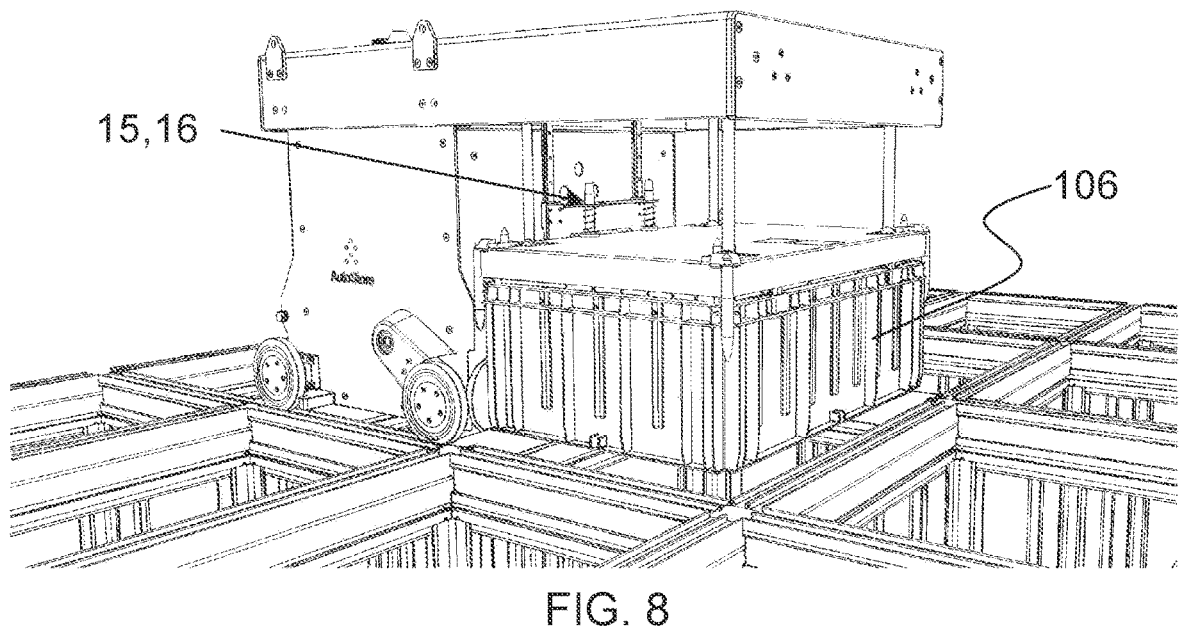
Figure 11:
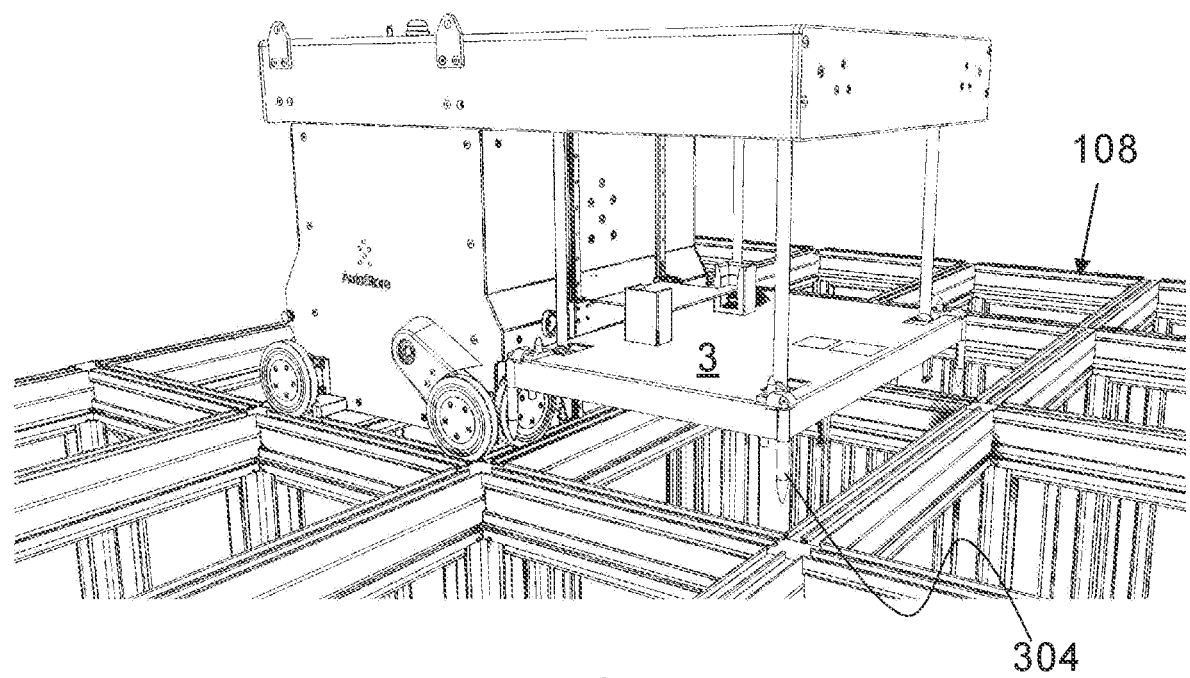
Figure 12:
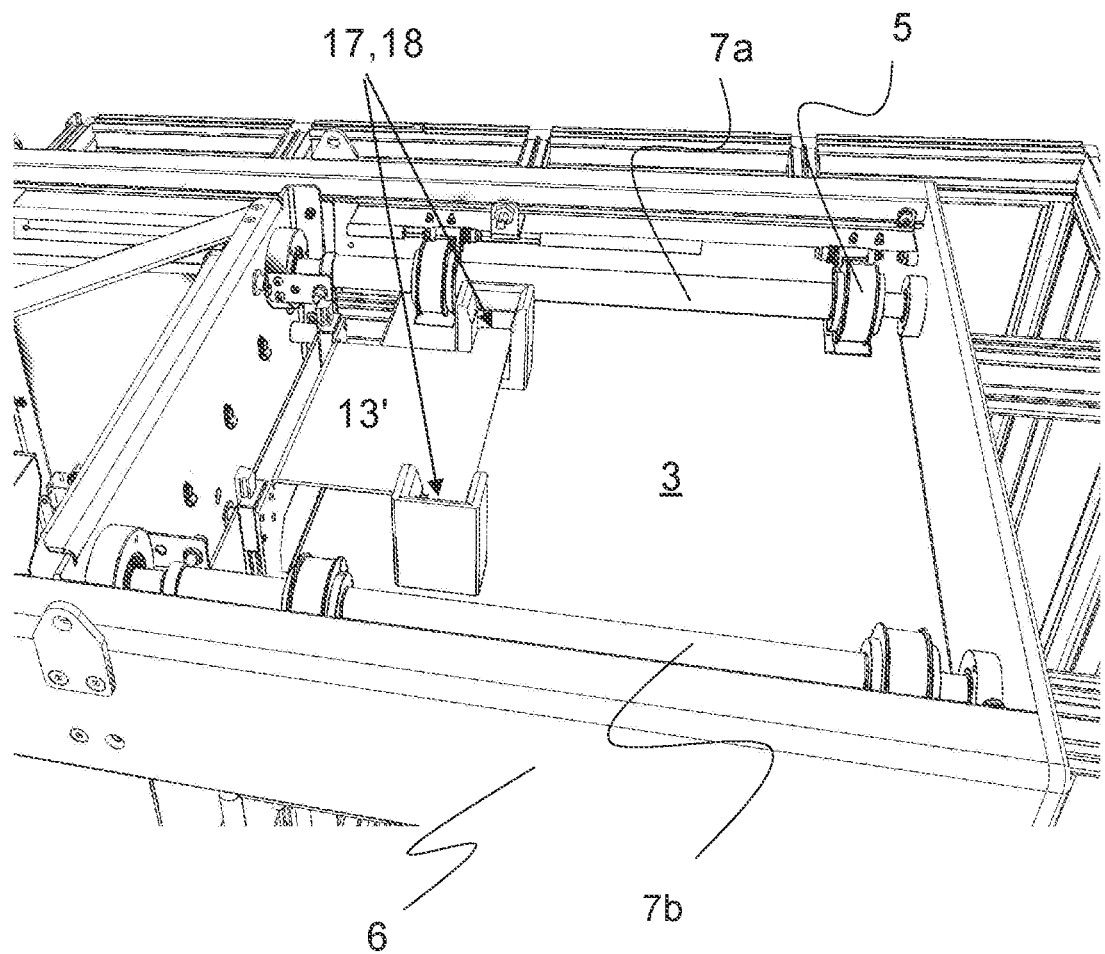
FIG. 12 is a perspective topside view of the container handling vehicle in FIGS. 9-11.
Figure 15:
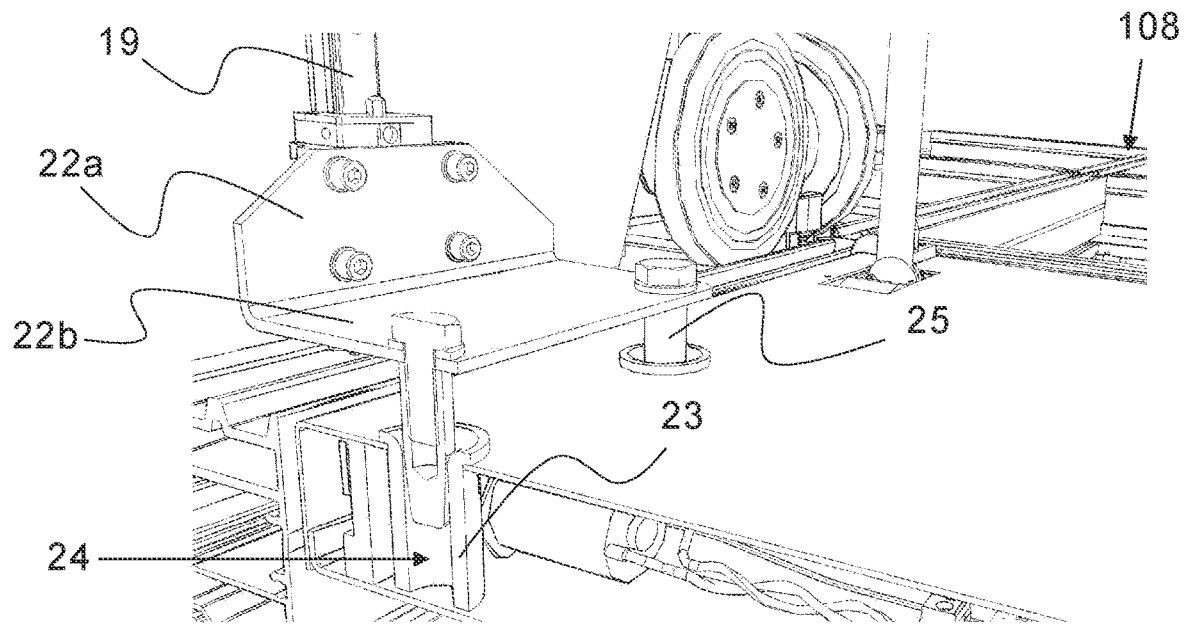
Figure 16:
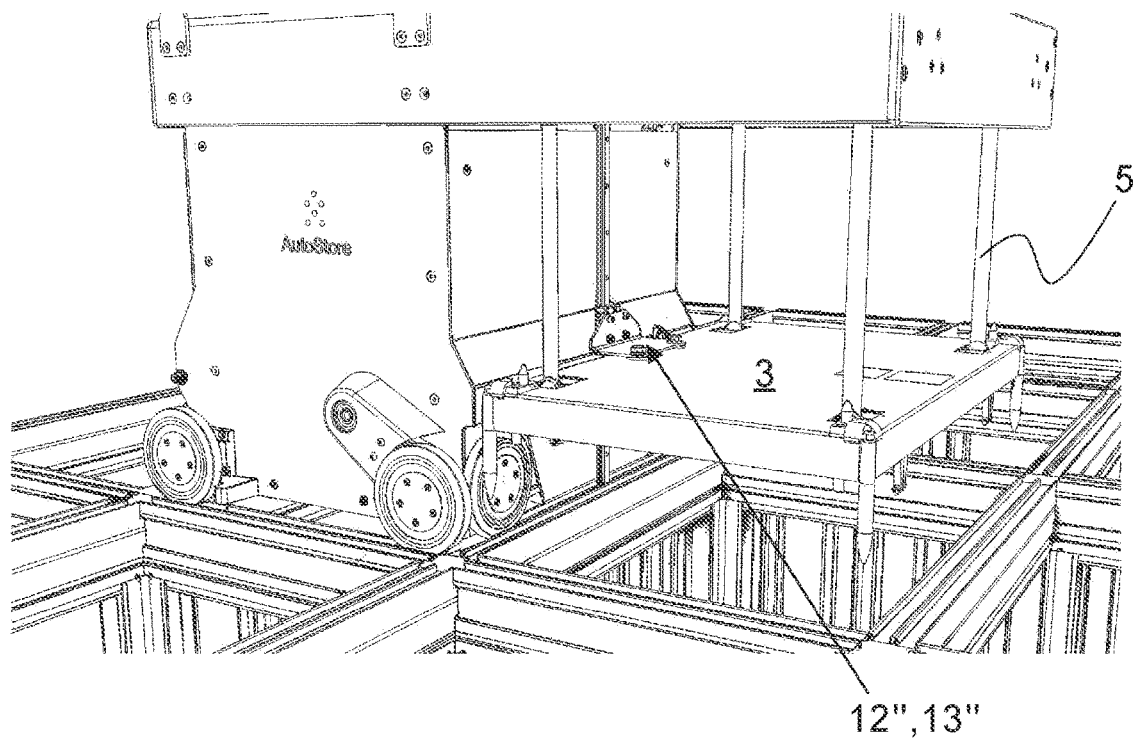

In view of the prior art cantilevered container handling vehicle 301, as shown in FIGS. 3 and 4, the container handling vehicle 10 of the invention is more efficient in that less time is required to perform multiple container lifting/storage operations. A prior art container vehicle 301 is not allowed to move upon a rail system 108 until its lifting frame 3 is fully raised into contact with the cantilevered section.

To allow movement of the container handling vehicle 10 upon the rail system 108, the vehicle 10 features a first set of wheels 21a arranged to allow movement of the vehicle along a first direction of the rail system 108 as shown in FIG. 1, e.g. along rails extending in a first direction X, and a second set of wheels 21b arranged to allow movement of the vehicle in a second direction, e.g. along rails extending in a second direction Y.

A second exemplary embodiment of a container handling vehicle 10' according to the invention is shown in FIGS. 9-12.

The container handling vehicle 10' is identical to the first exemplary container handling vehicle 10 in FIGS. 5-8 apart from the design of the first guide device 12' and the cooperating second guide device 13'.

The first guide device 12' comprises two vertical recesses 17 (i.e. first guide elements) arranged at a top side 14 of the lifting frame 3. The second guide device 13' comprises two protrusions 18 (i.e. second guide elements), each protrusion 18 being sized to be accommodated in one of the vertical recesses 17 of the first guide device 12'. The second guide device 13' is slidably connected to the sidewall 9 via two rails 19 and can move in a vertical direction relative to the sidewall 9. A part of the second guide device 13' featuring the two protrusions 18 extends laterally from the sidewall 9 and is positioned between the cantilevered section 6 and the lifting frame 3. A spring 20' or other compliant device is arranged in each of the recesses 17 to dampen the interaction between the first and the second guide device 12',13' and the lifting frame 3.

A third exemplary embodiment of a container handling vehicle 10" according to the invention is shown in FIGS. 13-16.

The container handling vehicle 10" is identical to the first and second exemplary container handling vehicles 10,10' in FIGS. 5-12 apart from the design of the first guide device 12" and the cooperating second guide device 13". The first guide device 12" comprises two vertical sleeves 23 positioned in the lifting frame 3 providing two holes 24 (i.e. first guide elements) at the top side 14 of the lifting frame 3. The second guide device 13" comprises two pins 25 (i.e. second guide elements), each pin 25 being sized to be accommodated in one of the complementary holes 24 of the first guide device 12". The second guide device 13" is slidably connected to the sidewall 9 via a rail 19 and can move in a vertical direction relative to the sidewall 9 while restricted from horizontal movement relative to the sidewall 9. A part of the second guide device 13" featuring the two pins 25 extends laterally from the sidewall 9 and is positioned between the cantilevered section 6 and the lifting frame 3. A spring (not shown) may be arranged around each of the pins 25, or alternatively within each of the sleeves 23, to dampen the interaction between the first and the second guide device 12",13" and the lifting frame 3.

The present invention is described by three specific combinations of guide elements, i.e. pin/hole and protrusion/recess, for restricting a horizontal movement of the lifting frame. However, based on the present disclosure multiple alternative combinations of guide elements having complimentary shapes providing a restricted horizontal movement may easily be envisioned.

The invention claimed is:

1. A container handling vehicle for lifting a storage container from an underlying framework structure, the vehicle comprises a container lifting assembly for lifting the storage container and a vehicle body;
   the container lifting assembly comprises a lifting frame for releasable connection to a storage container, a lifting shaft assembly, and a plurality of lifting bands, the lifting bands are connected to the lifting frame and the lifting shaft assembly such that the lifting frame may be raised or lowered by operating the lifting shaft assembly; and
   the vehicle body comprises a sidewall and a cantilevered section from which the lifting frame depends, the cantilevered section extends laterally from an upper end of the sidewall;
   wherein the container lifting assembly features a lifting frame guide assembly comprising a first guide device and a cooperating second guide device;
   wherein the first guide device is provided on the lifting frame;
   wherein the second guide device is slidably connected to the sidewall via at least one vertically extending rail, such that the second guide device can move in a vertical direction relative to the sidewall;
   wherein the first guide device and the second guide device are arranged to interact with each other when the lifting frame is adjacent the sidewall, such that horizontal movement of the lifting frame relative to the vehicle body is restricted; and
   wherein a section of the second guide device is arranged between the cantilevered section and the lifting frame.

2. The vehicle according to claim 1, wherein the second guide device is slidably connected to the sidewall, such that horizontal movement of the second guide device relative to the sidewall is prevented.

3. The vehicle according to claim 1, wherein the vertical rail extends from a lower position on the sidewall towards the cantilevered section, such that the second guide device is configured to move in a vertical direction between a lower position adjacent to the sidewall and an upper position in which the lifting frame is configured to dock with the cantilevered section.

4. The vehicle according to claim 1, wherein the first guide device comprises at least one first guide element and the second guide device comprises at least one second guide element, wherein the first guide element and the second guide element have complementary shapes such that horizontal movement between the first guide element and the second guide element is restricted when the first guide element interact with the second guide element.

5. The vehicle according to claim 1, wherein one of the first guide device and the second guide device comprises at least one guide element being a pin, protrusion, recess, or hole and the other one of the first guide device and the second guide device comprises a complementary guide element for interacting with the at least one pin, protrusion, recess or hole, such that horizontal movement of the first guide device relative to the second guide device is restricted.

6. The vehicle according to claim 1, wherein the first guide device comprises two first guide elements being horizontally spaced, and the second guide device comprises two second guide elements, each of the first guide elements arranged to interact with a corresponding second guide element.

7. The vehicle according to claim 1, wherein one of the first guide device and the second guide device comprises at least one pin or vertical recess, and one of the first guide device and the second guide device comprises a cooperating hole or protrusion, respectively, such that horizontal movement of the first guide device relative to the second guide device is restricted.

8. The vehicle according to claim 1, wherein one of the first guide device and the second guide device comprises a spring arranged to dampen the interaction between the first guide device and the second guide device in a vertical direction.

9. The vehicle according to claim 1, comprising:
   a first set of wheels arranged on opposite sides of the vehicle body, for moving the vehicle along a first direction on a rail system of the underlying framework structure;
   a second set of wheels arranged on other opposite sides of the vehicle body, for moving the vehicle along a second direction on the rail system, the second direction being perpendicular to the first direction; and
   the first set of wheels being displaceable in a vertical direction between a first position, wherein the first set of wheels allows movement of the vehicle along the first direction, and a second position, wherein the second set of wheels allows movement of the vehicle along the second direction.

10. A storage system comprising a framework structure and at least one container-handling vehicle according to claim 1, wherein the framework structure comprises multiple storage columns, in which storage containers may be stored on top of one another in vertical stacks, and the container handling vehicle is operated on a rail system at a top level of the framework structure for retrieving storage containers from, and storing storage containers in, the storage columns, and for transporting the storage containers horizontally across the rail system.

11. A method of operating a container handling vehicle in a storage system,
   the storage system comprising a framework structure and at least one container-handling vehicle, wherein the framework structure comprises multiple storage columns, in which storage containers may be stored on top of one another in vertical stacks, and the container handling vehicle is operated on a rail system at a top level of the framework structure for retrieving storage containers from, and storing storage containers in, the storage columns, and for transporting the storage containers horizontally across the rail system, the container handling vehicle comprises a container lifting assembly, for lifting the storage container, and a vehicle body;

the container lifting assembly comprises a lifting frame for releasable connection to a storage container, a lifting shaft assembly and a plurality of lifting bands, the lifting bands are connected to the lifting frame and the lifting shaft assembly such that the lifting frame may be raised or lowered by operating the lifting shaft assembly; and the vehicle body comprises a sidewall and a cantilevered section from which the lifting frame is suspended, the cantilevered section extends laterally from an upper end of the sidewall;

wherein the container lifting assembly features a lifting frame guide assembly comprising a first guide device and a cooperating second guide device;

wherein the first guide device is provided on the lifting frame;

wherein the second guide device is slidably connected to the sidewall via at least one vertically extending rail, such that the second guide device can move in a vertical direction relative to the sidewall; and wherein the first guide device and the second guide device are arranged to interact with each other when the lifting frame is adjacent the sidewall such that horizontal movement of the lifting frame relative to the vehicle body is restricted; wherein the method comprises:

lowering a storage container into a storage column by use of the container lifting assembly;

releasing the storage container from the lifting frame;

raising the lifting frame until the first guide device interacts with the second guide device; and moving the container handling vehicle horizontally across the rail system when a lowermost level of the lifting frame is above an uppermost level of the rail system and before the lifting frame has reached an upper position.

12. A method of preventing horizontal movement of a lifting frame of a container handling vehicle, the container handling vehicle comprises a container lifting assembly, for lifting a storage container, and a vehicle body;

the container lifting assembly comprises the lifting frame for releasable connection to a storage container, a lifting shaft assembly and a plurality of lifting bands, the lifting bands are connected to the lifting frame and the lifting shaft assembly such that the lifting frame may be raised or lowered by operating the lifting shaft assembly;

the vehicle body comprises a sidewall and a cantilevered section from which the lifting frame is suspended, the cantilevered section extends laterally from an upper end of the sidewall;

the container lifting assembly features a lifting frame guide assembly comprising a first guide device and a cooperating second guide device;

the first guide device is provided on the lifting frame; and the second guide device is slidably connected to the sidewall via at least one vertically extending rail, such that the second guide device can move in a vertical direction relative to the sidewall, wherein a section of the second guide device is arranged between the cantilevered section and the lifting frame;

wherein the method comprises:

raising the lifting frame from a level below the container handling vehicle to a first position in which interaction between the first guide device and the second guide device is initiated; and raising the lifting frame from the first position to a second position in which the first guide device and the second guide device interact with each other and horizontal movement of the lifting frame relative to the vehicle body is restricted.

13. The method according to claim 12, further comprising:

raising the lifting frame from the second position to a third position, while the second guide device is simultaneously moved up the vertically extending rail by the lifting frame, the first guide device simultaneously interacting with the second guide device to restrict horizontal movement of the lifting frame relative to the vehicle body.

* * * * *